US012246554B2

(12) United States Patent
Katsikas et al.

(10) Patent No.: US 12,246,554 B2
(45) Date of Patent: Mar. 11, 2025

(54) WRITING INSTRUMENTS

(71) Applicant: BIC Violex Single Member S.A., Anoixi (GR)

(72) Inventors: Georgios Katsikas, Anoixi (GR); Dimitrios Efthimiadis, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 0 days.

(21) Appl. No.: 18/394,734

(22) Filed: Dec. 22, 2023

(65) Prior Publication Data

US 2024/0208260 A1 Jun. 27, 2024

(30) Foreign Application Priority Data

Dec. 22, 2022 (EP) .................................... 22216150

(51) Int. Cl.
*B43K 24/08* (2006.01)

(52) U.S. Cl.
CPC .................................. *B43K 24/082* (2013.01)

(58) Field of Classification Search
CPC ....... B43K 21/02; B43K 21/16; B43K 24/082
See application file for complete search history.

(56) References Cited

U.S. PATENT DOCUMENTS 2,881,736 A * 4/1959 Zepelovitch ......... B43K 24/082 401/104
3,181,507 A 5/1965 Dannebaum
3,836,264 A * 9/1974 Saito ...................... B43K 21/16 401/99
3,883,253 A * 5/1975 Naruse ................... B43K 21/20 401/99
4,790,678 A 12/1988 Araki
4,955,739 A * 9/1990 Kageyama ........... B43K 21/027 401/92
5,967,684 A * 10/1999 Huang ................. B43K 24/082 24/11 R
6,758,617 B2 * 7/2004 Sakaoka .................. B43K 7/12 401/92

(Continued)

FOREIGN PATENT DOCUMENTS

KR 20010057362 A 7/2001

OTHER PUBLICATIONS

Search Report issued in European Application No. 22216150.7, mailed on May 17, 2023.

*Primary Examiner* — David P Angwin
*Assistant Examiner* — Bradley S Oliver
(74) *Attorney, Agent, or Firm* — Bookoff McAndrews, PLLC

(57) ABSTRACT

A writing instrument may include a barrel having a longitudinal axis, a cartridge, a writing tip, a self-retracting system for sliding the cartridge inside the barrel between a first position wherein the writing tip extends outside the barrel and a second position wherein the writing tip is retracted, the system comprising a button configured to move the cartridge between the first and the second position, and a sealing member configured to be actuated between a closed position closing a writing passage of the writing instrument, wherein the self-retracting system further comprises a linkage that connects the button and the cartridge, the linkage being configured to convert an actuation of the button into a linear motion of the cartridge along the longitudinal axis.

18 Claims, 4 Drawing Sheets

(56) References Cited

U.S. PATENT DOCUMENTS

| | | | | |
|---|---|---|---|---|
| 7,255,507 | B2 * | 8/2007 | Lammers | B43K 8/028 401/107 |
| 11,904,625 | B1 * | 2/2024 | Ellis | B43K 24/082 |
| 2009/0232581 | A1 * | 9/2009 | Tong | B43K 8/06 401/101 |
| 2015/0317000 | A1 * | 11/2015 | Liu | G06F 3/03545 345/179 |
| 2020/0282762 | A1 | 9/2020 | Rolion et al. | |

* cited by examiner

WRITING INSTRUMENTS

CROSS REFERENCE TO RELATED APPLICATIONS

This application claims benefit from European patent application EP 22216150.7 filed on Dec. 22, 2022, its content being incorporated herein by reference.

TECHNICAL FIELD

The present disclosure relates to the field of writing devices. More specifically, the present disclosure relates to writing devices with a writing tip that can be extended and retracted and sealed.

BACKGROUND

Writing instruments comprising a barrel and a writing tip that can be extended outside the barrel for writing purpose when a user actuates a writing tip extension-retraction system inside the barrel and retracted inside the barrel when the user no longer needs to use the writing instrument are largely known.

However, these systems are not designed to provide protection to the internal components of the writing instrument, which may be subject to damage or drying out if exposed to the ambient environment, while also prioritizing seamless extension of the writing tip during operation and retraction during non-operation.

The present disclosure aims to address one or more problems in the prior art.

SUMMARY

In a first aspect, the present disclosure relates to a writing instrument comprising a barrel having a longitudinal axis, a cartridge, a writing tip provided at one end of the cartridge, a self-retracting system configured to slide the cartridge axially inside the barrel between a first extended forward position wherein the writing tip extends outside the barrel and a second retracted rearward position wherein the writing tip is retracted inside the barrel from the first extended forward position along an axial rearward direction, the self-retracting system comprising: a button configured to, when actuated, move the cartridge into the first extended forward position, and when not actuated, move the cartridge into the second retracted rearward position, wherein the self-retracting system further comprises a linkage that connects the button and the cartridge, the linkage being configured to convert an actuation of the button into a linear motion of the cartridge along the longitudinal axis.

Thus, aspects of the present disclosure are able to provide an intuitive system for providing the easiest usage experience along with superior protection of the sensitive inner components of the writing instrument. Opening the writing instrument is natural and unobtrusive to the use of the writing instrument itself. Further, when the writing instrument is not in use, the writing tip may be automatically withdrawn into the barrel of the writing instrument and protected against the deleterious effects of the ambient environment. Additionally, the system is not bound to the orientation of the writing instrument itself, and thus is effective regardless of the circumstances of usage.

In particular, in the writing instrument of the first aspect, the linkage makes it possible to achieve a broad displacement of the writing instrument for a limited displacement of the button.

In an example, the self-retracting system comprises a sealing member configured to be actuated between a closed position where the sealing member substantially closes a writing passage of the writing instrument and an open position where the writing passage is not closed by the sealing member.

In an example, the cartridge is configured to actuate the sealing member from the closed position to the open position when the cartridge is moved from the second retracted rearward position to the first extended forward position and to allow the sealing member to move from the open position to the closed position when the cartridge is in the second retracted rearward position.

In an example, the sealing member comprises two moveable sealing parts configured to move between the closed position and the open position of the sealing member.

In an example, the sealing member comprises more than two moveable sealing parts, for example three or four sealing parts.

In an example, the sealing parts are configured to pivot around respective transverse axes, between the closed position and the open position.

In an example, the sealing parts sealingly cooperate with each other when the sealing member is in the closed position. By ‘sealingly cooperate with each other’ is understood that the contact between the sealing parts is substantially airtight so that air at atmospheric pressure does not tend to permeate at the contact surface, thus avoiding or substantially avoiding air exchanges between the inside of the sealing member where the writing passage is located, and the outside of the sealing member.

In case of more than two moveable sealing parts, a sealing part may be in contact with some or every other sealing parts.

In an example, the sealing parts are configured to be brought together in the closed position of the sealing member and to move apart from each other in the open position.

In an example, in the open position, the sealing parts define between them a passage for the writing tip. The passage may include the writing passage.

In an example, the writing member comprises a first biasing member for urging the sealing member from the open position to the closed position. The first biasing member may be the sealing parts, configured to revert back from the open position to the closed position, for example elastically.

In an example, the cartridge is configured to push against an inner surface of the sealing member to actuate the sealing member from the closed position to the open position.

In an example, the linkage comprises a first sliding end configured to slide against an inclined surface of the cartridge, the linkage and the cartridge being configured so that upon actuation of the button, the sliding end exerts pressure on the inclined surface so as to move the cartridge frontward.

In an example, the linkage comprises a second sliding end configured, upon actuation of the button, either slide on the cartridge or slide on the barrel. In an example, the second sliding end slides on an outer surface of the cartridge. In an example, the second sliding end slides on an inner surface of the barrel.

In an example, the linkage has a second sliding end wherein the second sliding end is configured to: come in contact with an inner surface of the barrel and slide on the inner surface of the barrel upon actuation of the button, or come in contact with an outer surface of the cartridge and slide on the outer surface of the cartridge upon actuation of the button.

Such a linkage provides efficient movement conversion from the button to the cartridge.

In an example, the sealing member is configured to interact with the barrel when the sealing member is in the closed position so as to form a substantially airtight sealing chamber therein, the writing tip being inside the sealing chamber when the cartridge is in the second retracted rearward position.

In an example, the button is located on the barrel so as to be operated by a user when the writing instrument is held in a writing position.

In an example, the button is configured to rotate around a pivot axis, wherein the pivot axis is preferably located near the rear end of the writing instrument.

This positioning of the pivot axis contributes to the efficient movement conversion from the button to the cartridge.

In particular, the structure of the linkage with sliding ends, of the cartridge with an inclined surface, and the location of the pivot axis near the rear end of the writing instrument together make it possible to maximize displacement of the cartridge for a reduced displacement of the push button.

In an example, the self-retracting system further comprises a second biasing member configured to urge the self-retracting system toward the second retracted rearward position.

In an example, the second biasing member is a spring.

In an example, the second biasing member is configured to exert permanent opposite pressure against the actuation of the button.

In an example, the second biasing member is connected to the cartridge.

In an example, the linkage is configured to better resist the second biasing member the more parallel the linkage is to the longitudinal axis during actuation.

Thus, due to the construction of the writing instrument, the sealing system is able to avoid adding undue strain to the user while still operating effectively. The user does not need to provide excess force to keep the button pressed, and so any additional inconvenience by the inclusion of the system is avoided.

In an example, the writing instrument further comprises a cartridge carrier having one or more bearings for supporting the cartridge inside the barrel.

In an example, the inclined surface is a straight inclined surface, formed at an angle of 15° to 75° with respect to the axis, as measured in the plane including the axis and perpendicular to the direction of the pivot axis.

In an example, the writing tip is a stylus for use with an electronic writing surface.

In an example, the cartridge is configured to supply writing medium such as ink to the writing tip.

The writing medium may comprise or consist of a solid writing medium, for example graphite; a liquid writing medium, for example ink; or any kind of writing medium available to the skilled person.

In an example, the writing instrument is ink-based. In other words, the writing medium is made of or comprises ink.

DETAILED DESCRIPTION

Hereinafter, a detailed description will be given of the present disclosure. The terms or words used in the description and the aspects of the present disclosure are not to be construed limiting as only having common-language or dictionary meanings and should, unless specifically defined otherwise in the following description, be interpreted as having their ordinary technical meaning as established in the relevant technical field. The detailed description will refer to specific embodiments to better illustrate the present disclosure, however, it should be understood that the presented disclosure is not limited to these specific embodiments.

On the drawings, identical elements (or parts of elements) are identified with the same reference signs. Between different embodiments, reference signs of elements (or parts of elements) having an analogous function share reference signs are incremented by 100, 200, etc.

Hereunder, the numbering “first” and “second” are to be understood as identifying and differentiating elements. The numbering is not meant to be understood as a ranking of relative importance of the elements. Unless stated otherwise, a “first” or a “second” element may be defined without the other “second” or “first” element.

In the present disclosure the term “gravity” naturally refers to the newtonian gravitational acceleration created by the earth and the term “gravity direction” refers to the direction of the acceleration which is oriented downwardly with respect to the location where the writing instrument is located.

Figure 1:
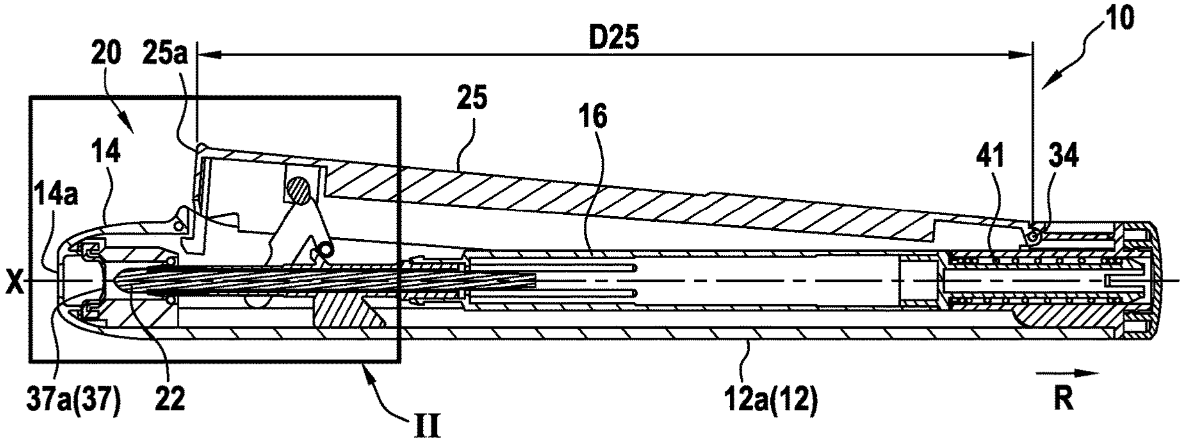
FIG. 1 shows a half-section view of the first exemplary embodiment of a writing instrument of the present disclosure in the retracted state.
Figure 2:
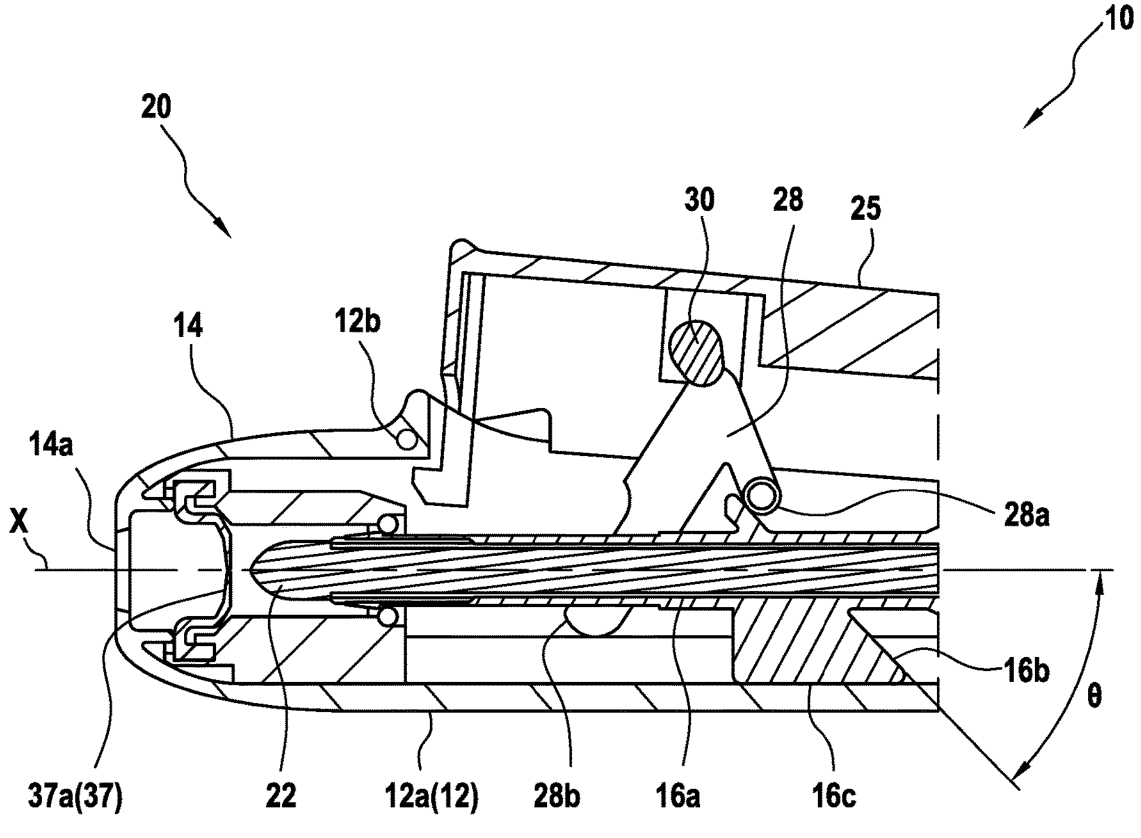
FIG. 2 shows a close-up view of the area II of FIG. 1.
Figure 3:
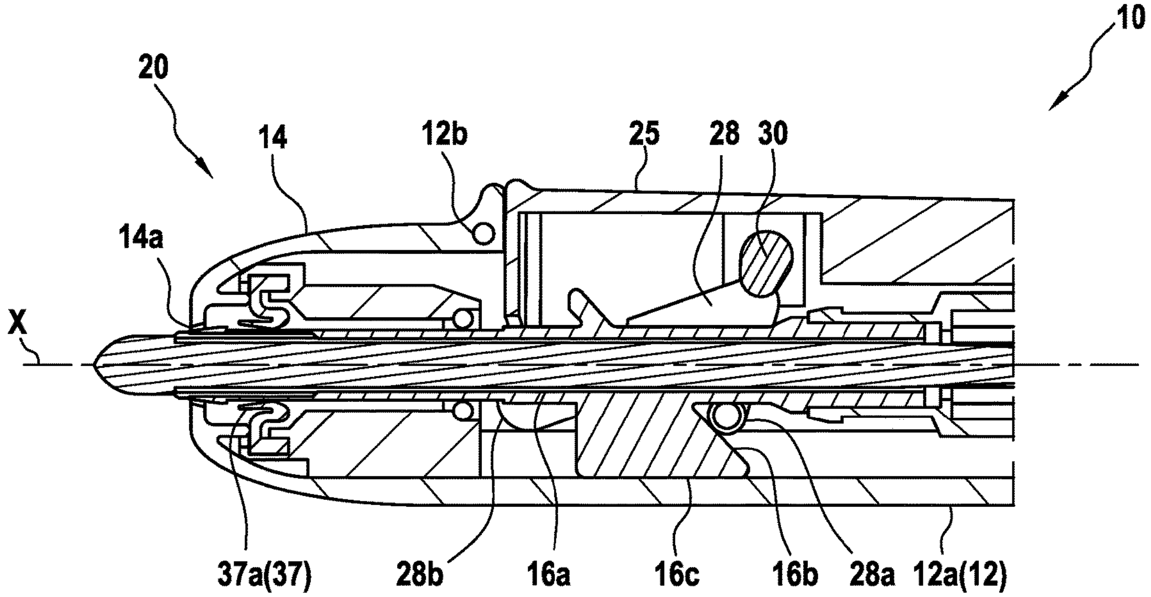
FIG. 3 shows a close-up view of the area II of FIG. 1 when the writing instrument of the first exemplary embodiment is in a writing state.

In a first exemplary embodiment, the present disclosure relates to a writing instrument 10 as shown in FIGS. 1 to 3 of which the description follows. Certain features of the writing instrument 10 are rendered invisible for ease of view in the figures. The following description will be made with reference to FIGS. 1 to 3 simultaneously as some details of the writing instrument do not appear on all the figures.

The writing instrument 10 may be a marker, a felt pen, a highlighter, a ball point pen, a permanent or non-permanent marker or any other type of writing instrument or stylus with an extension and retraction mechanism for extending and retracting a writing tip of the instrument when necessary. The writing tip may, for example, convey ink to a writing surface when the writing instrument is ink-based. Alternatively, or additionally, the writing tip may be a contact point when the writing instrument is a stylus, such as, for instance, a stylus that may be used to interact with an electronic writing surface.

The writing instrument 10 may comprise a barrel or tubular body 12 having a longitudinal axis X. The tubular body 12 may be a unitary body, or may comprise multiple components.

The writing instrument 10 may comprise at a first forward end of the barrel 12 a cap 14 having a writing passage 14*a* formed therein. The cap 14 is mounted at the forward end of the writing instrument 10 such that the cap surrounds said forward end, with the writing passage 14*a* of the cap facing the writing tip 22, so as to allow the writing tip 22 to extend through the writing passage 14*a* when the cartridge is in the first extended forward position detailed below with respect to FIGS. 4, 5 and 6. The cap 14 may be detachably attached to the barrel 12, such that the tip component 14 may be removed, for example, to replace internal components of the writing instrument 10. The cap 14 and the barrel 12 may be of unibody construction (integrally formed). The writing instrument 10 may also include a cartridge 16. In an example where the writing instrument 10 is an ink-based marking device, the cartridge 16 may be a conveyance for transporting ink to a writing tip 22 of the cartridge 16, such as via a channel 16*a*. The writing instrument 10 may include components for supporting the cartridge 16 within the writing instrument 10, such as a cartridge carrier. The cartridge carrier may include one or more bearings for centering the cartridge 16 inside the barrel 12. For example, the cartridge carrier may include one or more sliding bearings. The writing instrument 10 may further comprise in the tubular body a tank (not shown) for storing a writing ink used by the writing tip 22. The barrel 12 may extend longitudinally in a rearward direction so as to cover as a sheath the internal components of the writing instrument 10. The writing instrument 10 may include other components or accessories typical to writing instruments, such as, but not limited to, a clip or an eraser.

The writing instrument 10 may comprise a self-retracting system 20 (hereinafter, "sealing system") that is configured to, when operated by a user, slide the writing tip 22 axially (along longitudinal axis X) through the barrel 12 between a first extended forward position (FIG. 3), wherein the writing tip 22 extends outside the writing passage 14*a*, and a second retracted rearward position (FIGS. 1 and 2), in which the writing tip 22 has been retracted inside the barrel 12 along an axial rearward direction (arrow R) from the first extended forward position of FIG. 3. The sealing system 20 is further configured to enclose the writing tip 22 when in the second rearward position.

The sealing system 20 may include a button 25 with at least a portion that is located on an external face of the writing instrument 10 such that it is accessible to a user. The button 25 may be located such that the user may actuate the button 25 when holding the writing instrument 10 in a writing position, e.g., when the user is holding the writing instrument 10 near the first forward end of the writing instrument 10 so as to mark a surface using the writing instrument 10. In the example shown, the button 25 is a hinge-style projection that extends from the outer surface of the barrel 12 perpendicularly to axis X and is located proximately to the writing passage 14*a*. The button 25 may be positioned near a front end of the writing instrument 10, such that the user may hold the button 25 when holding the writing instrument 10 in position for marking a surface. In other words, the button 25 has a front end that is closer to the front end of the writing instrument 10 than to the rear end of the writing instrument 10. The button 25 may be positioned at less than 6 cm of the front end of the writing instrument 10, for example less than 3 cm, for example less than 1 cm. Thus, when a user is holding the writing instrument 10, such as to use the writing instrument 10 in the act of marking a surface, the user may be able to operate the button 25 in a manner that is natural to the act of gripping a writing instrument 10, such as to operate the button 25 with a finger of the writing hand.

The button 25 may be configured to pivot around a pivot axis 34 that is perpendicular to the axis X. The pin axis 34 may be located on or near an external surface of the barrel 12, and the pin axis 34 may be formed of a portion of the barrel 12. The pivot axis 34 may be positioned near a rear end of the writing instrument 10. In other words, the pivot axis 34 is closer to the rear end of the writing instrument 10 than to the front end of the writing instrument 10. The pivot axis 34 may be positioned at less than 15 cm of the front end of the writing instrument 10, for example less than 10 cm, for example less than 7 cm. For example, the pivot axis 34 may be positioned at 13 cm of the front end of the writing instrument 10.

The distance D25 between the pivot axis 34 and the front end 25*a* of the button 25 may be more than 5 cm, for example more than 9 cm, for example more than or equal to 13 cm.

The button 25 may be connected via a linkage 28 to the cartridge 16. The linkage 28 may be configured so as to convert an actuation of the button 25, which may produce a rotation of the linkage 28, into a linear motion of the cartridge 16 along axis X. When the button 25 is actuated, the portion of the linkage 28 connected to the button 25 may be moved towards axis X. A portion of the linkage 28 connected to the cartridge 16 may thus push the cartridge 16 toward the writing passage 14*a*, and thus extend the writing tip 22 outside of the barrel 12 through the writing passage 14*a*. For instance, the portion of the linkage 28 connected to the button 25 may be substantially fixed laterally such that it moves along the axis X in sync with the button 25, but may be able to rotate at the point of the connection to the button 25. The linkage 28 may be connected to the button 25 via a pivot 30. The axis of the pivot 30 may be parallel to the pivot axis 34. The linkage 28 may have a first sliding end 28*a*, configured to slide against an inclined surface 16*b* of the cartridge 16. The inclined surface 16*b* may be formed at a distance of the axis X, so as to not disrupt conveyance of ink to the writing tip 22. Upon actuation of the button 25, the sliding end 28*a* is moved towards the axis X and thereby exerts pressure on the inclined surface 16*b*. The frontward displacement of the cartridge 16 for a given rotation of the button 25 can be controlled by the slope of the inclined surface 16*b*. The inclined surface 16*b* may for example be a straight inclined surface, formed at an angle $\theta$ of 15° to 75° with respect to the axis X, as measured in the plane including the axis X and perpendicular to the direction of the pivot axis 34, preferably an angle $\theta$ of 30° to 60°, preferably an angle $\theta$ of 40° to 50°.

As the angle $\theta$ is closer to 0°, more frontward displacement of the cartridge 16 may be achieved, but at the risk of movement being hampered by friction for angle $\theta$ close to 0° due to the force being applied to the cartridge 16 almost perpendicular to the direction of displacement of the cartridge 16.

As the angle $\theta$ is closer to 90°, less frontward displacement of the cartridge 16 may be achieved, but movement is facilitated, due to the force being applied to the cartridge 16 almost parallel to the direction of displacement of the cartridge 16.

The angle $\theta$ may be measured between the contact points of the first sliding end 28*a* and the inclined surface 16*b* respectively in the first extended forward position and in the second retracted rearward position. In other words, the angle θ may be measured between extreme contact points of the first sliding end 28*a* and the inclined surface 16*b* in the whole range of movement.

In examples, the sliding end 28*a* may have a curved profile so as to adapt the ease at which a displacement of the cartridge 16 can be achieved, over the whole range of movement of the button 25.

For instance, the inclined surface 16*b* may be curved so as to reduce the effect of a changing direction of displacement of the pivot 30 as the button 25 is actuated. To this end, the inclined surface 16*b* may be curved inward (concave).

The inclined surface 16*b* may be curved outward (convex).

The inclined surface 16*b* may be curved so as to locally ease the displacement of the cartridge 16, for example to overcome the resistance of sealing parts 37*a* (further detailed below).

The linkage 28 may have a second sliding end 28*b*. The second sliding end 28*b* may be configured to come in contact with an inner surface of the barrel 12 so as to slide on the inner surface of the barrel 12.

The second sliding end 28*b* may be closer to the front end of the writing instrument 10 than the first sliding end 28*a* is. In particular, the second sliding end 28*b* may be positioned such that, over the whole range of movement, the projection of the second sliding end 28*b* on the axis X is closer to the front end of the writing instrument 10 than the projection of the pivot 30 is.

The distance between the projection of the second sliding end 28*b* on the axis X and the projection of the pivot 30 on the axis X is for example more than 0 cm and less than 3 cm, for example more than or equal to 1,2 cm.

As the button 25 is actuated and using the directions of FIGS. 1 and 2 for the sake of the explanation, substantially downward force is applied to the linkage 28 via the pivot 30, leading to substantially upward force being applied to the second sliding end 28*b* as a reaction of the barrel 12 to the downward force transmitted by the linkage 28. With the relative positioning of the second sliding end 28*b* and the pivot 30, these two forces create a (i.e. clockwise) torque that brings the first sliding end 28*a* to rotate (i.e. clockwise) around the pivot 30, thereby leading the inclined surface 16*b* and thus the cartridge 16 to move frontward.

As the button 25 keeps being actuated, the contact between the first sliding end 28*a* and the inclined surface 16*b* and the contact between the second sliding end 28*b* and the inner surface of the barrel 12 are kept, such that the cartridge 16 keeps being brought frontward, e.g. towards the first extended forward position.

The second sliding end 28*b* may be configured so as to slide on an inner surface of the barrel 12, preferably along the axis X.

The cartridge 16 may be configured so as to only be moveable in a sliding manner along the axis X when the button 25 is actuated. The cartridge 16 may be configured so as to only be moveable in a sliding manner along the axis X when the button 25 is released.

The cartridge 16 may have a sliding surface 16*c*, configured to slide against an inner surface of the barrel 12. The sliding surface 16*c* may be formed opposite to the button 25 with respect to the axis X. The sliding surface 16*c* may be inclined such that its closest end to the button 25 is closer to the front of the writing instrument 10 than its furthest end to the button 25.

As the button 25 is actuated, the sliding surface 16*c* is pushed against the inner surface of the barrel 12, thereby restraining movement of the cartridge away from the axis X. When the button 25 is released, a reaction force from the first sliding end 28*a* may restrict the movement of the cartridge along the axis X, albeit with less resistance than as compared to when the button 25 is actuated.

The sealing system 20 may include a sealing member 37 that is configured to, when in a closed position (such as in FIGS. 1 and 2), substantially close the writing passage 14*a* so as to enclose the writing tip 22 within the barrel 12 of the writing instrument 10, and when in an open position (such as in FIGS. 3 and 4), allow passage of the writing tip 22 through the writing passage 14*a* outside of the barrel 12 of the writing instrument 10. The sealing member 37 may be located at or near the forward end of the barrel 12.

In an aspect, the sealing member 37 comprises sealing parts 37*a*. Sealing parts 37*a* may be moveable sealing parts moving between the open position and the closed position. In the open position, the sealing parts 37*a* substantially close the writing passage 14*a* by sealingly cooperating with each other. In the closed position, the sealing parts 37*a* allow passage of the writing tip 22 through the writing passage 14*a* outside of the barrel 12 of the writing instrument 10.

Figure 7:
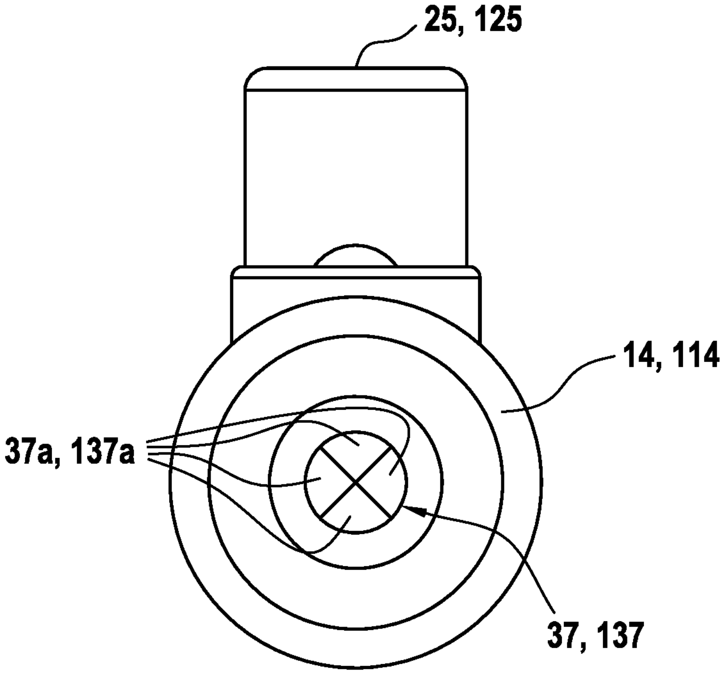
FIG. 7 shows a view of the first and second exemplary embodiments of the writing instrument as seen from a front side when the writing instrument is in a retracted state.
Figure 8:
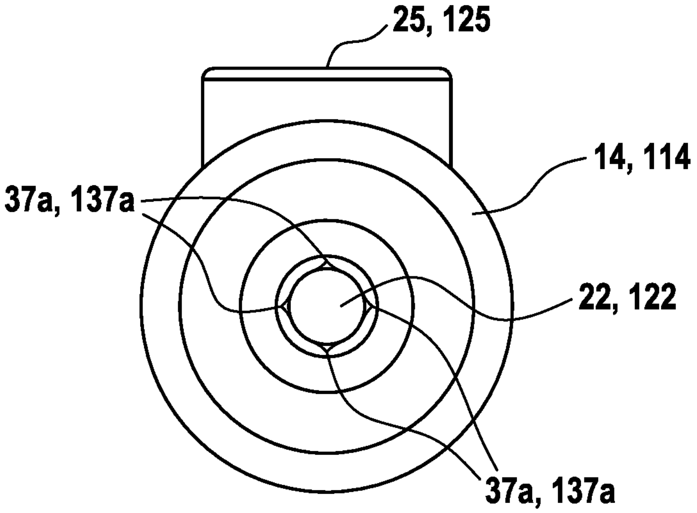
FIG. 8 shows a view of the first and second exemplary embodiments of the writing instrument as seen from a front side when the writing instrument is in a writing state.

The sealing member 37 may comprise at least two sealing parts 37*a*, preferably three or more, preferably four or more. In the view of FIGS. 7 and 8, the sealing member 37 comprises four sealing parts 37*a*. The sealing parts 37*a* may be flaps with cooperating shapes so as to close a front opening of the writing member 10, e.g. to close the writing passage 14*a*. The sealing parts 37*a* may extend inward from the whole circumference of an opening in the cap 14. In a closed position, the sealing parts 37*a* may sealingly cooperate.

The sealing parts 37*a* may be arranged symmetrically along the axis X by multiple-fold rotational symmetry.

The sealing parts 37*a* may be configured to revert back from the open position to the closed position, for example elastically.

The cartridge 16 may include a seal, such as a rubber seal, positioned on an outer surface of the cartridge 16 and that is configured to make the interface between the cartridge 16 and the barrel 12 substantially air tight.

As the cartridge 16 moves through the writing passage 14*a* toward the first extended forward position, the cartridge 16 actuates the sealing member 37 from the closed position to the open position. In the example shown, the cartridge 16 comes into contact against the sealing member 37 and pushes the sealing member 37 from the closed position to the open position. In particular, the cartridge 16 pushes open the sealing parts 37*a*. When the cartridge 16 is in the second retracted rearward position, the cartridge 16 does not form an obstacle to the movement of the sealing member 37, and in particular allows the sealing member 37 to move back from the open position to the closed position.

The sealing parts 37*a* may be sectors of a disk that form a whole disk closing the writing passage 14*a* when in the closed position. In the example of FIG. 7 shown, the sealing parts 37*a* are four quarters of a disk. The sealing parts 37*a* may extend towards the axis X. As seen on FIG. 8, as the cartridge 16 is moved towards the first extended forward position, the writing tip 22 pushes aside the ends of the sealing parts 37*a*, away from the axis X.

When the sealing member 37 is in the closed position, the sealing parts 37*a*, the barrel 12 and the cartridge 16 may define a sealing chamber 37*b* therein. The sealing chamber 37*b* may be hermetically sealed, such that the writing tip 22 at the end of the cartridge 16 may be protected by being provided in the sealing chamber 37*b*.

When the button 25 is in the resting position (FIGS. 1 and 2), such that a user has not actuated the button 25, the sealing member 37 is in the closed position closing the writing passage 14*a*. Thus, actuation of the button 25 (FIG. 3), such as by a user, provides for: 1) the writing tip 22 being pushed laterally (e.g., axially, along axis X) through the writing passage 14*a* such that the writing tip 22 is now in position for marking and 2) the sealing member 37 being pushed into the open position such that the writing passage 14*a* is no longer closed and the writing tip 22 is exposed. Likewise, when the button 25 is released, the writing tip 22 may be withdrawn back into the barrel 12 of the writing instrument 10, and the sealing member may move into the closed position, thus returning the writing instrument 10 to the state of FIGS. 1 and 2.

The sealing system 20 may further comprise a biasing member 41, e.g. a spring, that is longitudinally disposed in the writing instrument 10 and has two opposite ends along its longitudinal dimension: one end may rest against at least one fixed stop that is arranged on an inner surface of the barrel 12, e.g. under the form of a peripheral inner ridge, and the opposite end of biasing member 41 may be ostensibly connected to the button 25, either directly or through an intermediary component. In the illustrations, the biasing member 41 is connected to the cartridge 16, and it is to be understood that the biasing member 41 may be connected operationally to the button 25 through linkages or components within the sealing system 20. Thus the biasing member 41 is positioned between a fixed part of the barrel 12 and a component of the button 25, or component otherwise interlinked with the button such as the cartridge 16, so as to exert permanent opposite (antagonistic) pressure against the actuation of the button 25. This ultimately pushes in a rearward direction the cartridge 16, and therefore pushes the sealing system 20 toward the second retracted position.

When the user ceases to actuate the button 25, the sealing system 20 is automatically released without any further specific action from the user and can slide rearwardly inside the barrel 12 under the action of biasing member 41, which is no longer compensated for by the actuation of the button 25, to occupy the second retracted position. Therefore the mere release of the button 25 as described above makes it possible to automatically close the sealing system 20 and cause the latter to move to a second retracted rearward position wherein the writing tip 22 is retracted inside the barrel 12 and the sealing member 37 is closed over the writing tip 22.

The barrel 12 may be formed of two parts. For example, the barrel 12 may be formed of two halves 12*a* assembled along a plane of assembly via attachment points 12*b*. The plane of assembly may be the plane in which the linkage 28 moves. In other words, the plane may be the plane in which the cartridge 16 and the button 25 move.

In supplement or in replacement, the sealing parts 37*a* may extend along the axis X. The sealing parts 37*a* may extend further rearward than the writing tip 22, when in the closed position. In particular, the sealing parts 37*a* may extend so as to be in contact with the cartridge 16 by surrounding the front end of the cartridge 16 when in the closed position. The sealing parts 37*a* may sealingly cooperate with the cartridge 16 when in the closed position. Therefore, when the sealing member 37 is in the closed position, the sealing parts 37*a* and the cartridge 16 may define a sealing chamber 37*b* therein. The sealing chamber 37*b* may be hermetically sealed, such that the writing tip 22 at the end of the cartridge 16 may be protected by being provided in the sealing chamber 37*b*.

In supplement or in replacement, a biasing member may be provided for urging the sealing member 37 from the open position to the closed position. In particular, the biasing member may be provided for urging the sealing parts 37*a* from the open position to the closed position.

In supplement or in replacement, the biasing member may include a resilient member. The resilient member may be a toric elastic member. The resilient member may for example be arranged against an outer surface of the sealing parts 37*a*, such that contraction of the elastic member leads to urging the sealing parts 37*a* into the closing position.

In supplement or in replacement, a groove may be formed in the outer surface of the sealing parts 37*a* so as to receive the elastic member.

Figure 4:
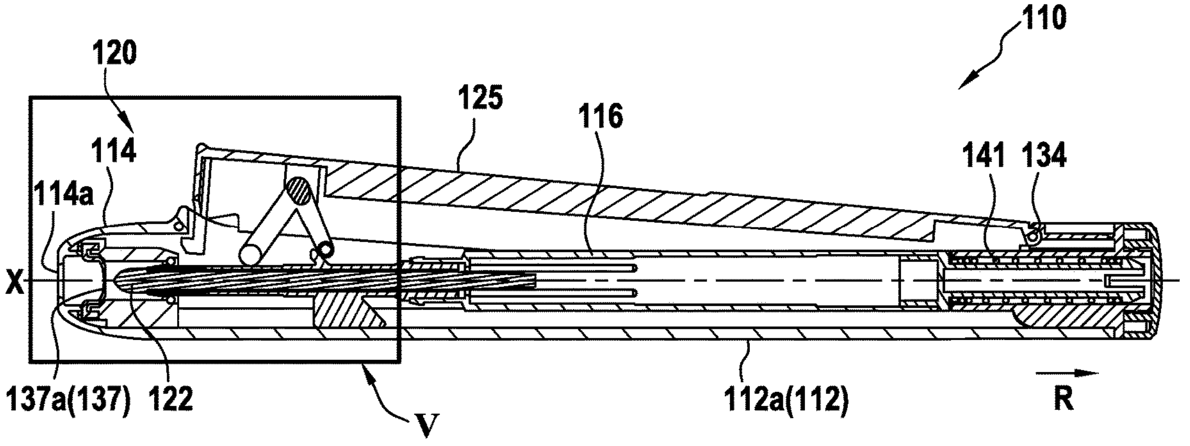
FIG. 4 shows a half-section view of the second exemplary embodiment of a writing instrument of the present disclosure in the retracted state.
Figure 5:
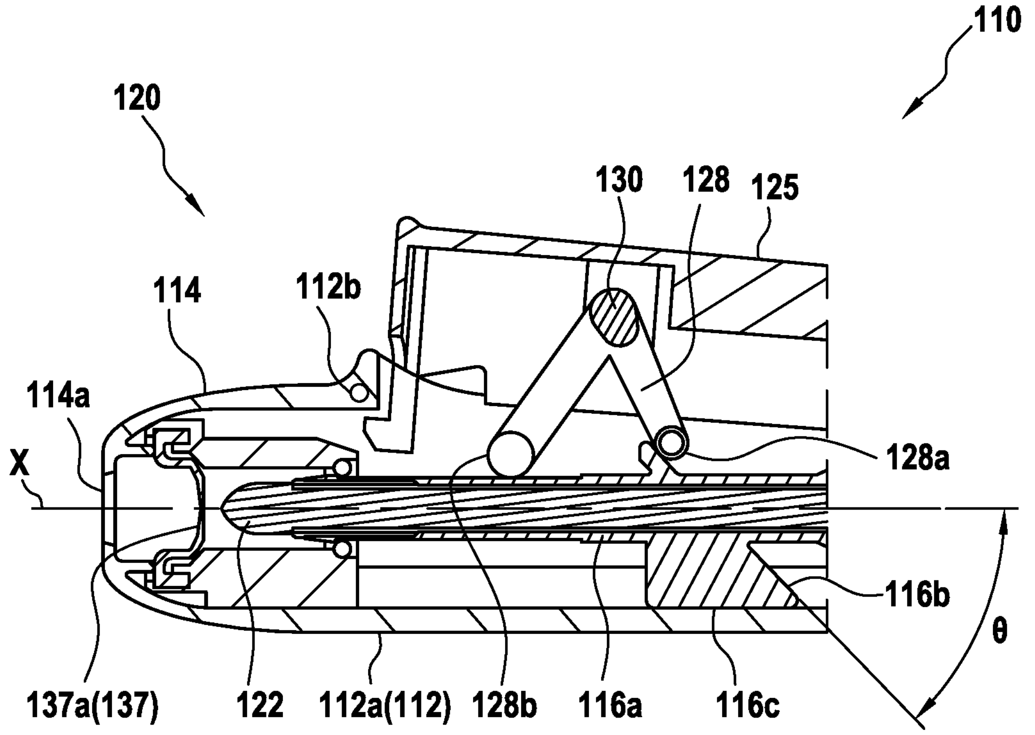
FIG. 5 shows a close-up view of the area V of FIG. 4.
Figure 6:
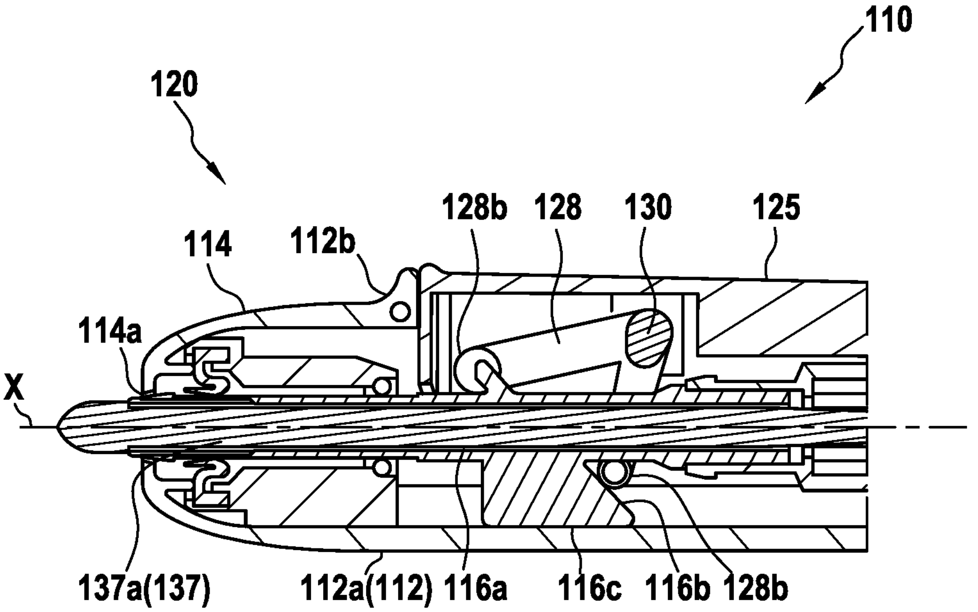
FIG. 6 shows a close-up view of the area V of FIG. 4 when the writing instrument of the second exemplary embodiment is in the writing state.

A second embodiment of the writing instrument will be described below with reference to FIGS. 4 to 6. FIGS. 4 to 6 are views of the second embodiment of the writing instrument which respectively correspond, with respect to the type of views and the position of the writing instrument, to FIGS. 1 to 3 of the first embodiment.

Unless stated otherwise, features of the second embodiment are the features of the first embodiment discussed above. For the sake of simplicity, these features are not repeated, and the same reference signs are used for the same parts.

The linkage 128 may have a second sliding end 128*b*. The second sliding end 128*b* may be configured to come in contact with an outer surface of the cartridge 116, so as to slide on the outer surface of the cartridge 116.

The second sliding end 128*b* may be positioned so as to come in contact with an outer surface of the cartridge 116 that faces the button 125.

As the button 125 is actuated, the difference with the first embodiment is that substantial upward force is applied to the second sliding end 128*b* as a reaction of the cartridge 16. With the relative positioning of the second sliding end 128*b* and the pivot 30, these two forces create a (i.e. clockwise) torque that brings the first sliding end 128*a* to rotate (i.e. clockwise) around the pivot 130, thereby bringing the inclined surface 116*b* and thus the cartridge 116 to move frontward.

The cartridge 116 may then be actuated between the first extended forward position and the second extended rearward position in a similar manner as the cartridge 16 of the first embodiment.

Although the embodiments of the present disclosure have been disclosed for illustrative purposes, those skilled in the art will appreciate that various modifications and alterations are possible, without departing from the present disclosure. It is also to be understood that such modifications and alterations are incorporated in the scope of the present disclosure and the accompanying claims.

The invention claimed is:

1. A writing instrument comprising:

a barrel having a longitudinal axis, a cartridge, a writing tip provided at one end of the cartridge, a self-retracting system configured to slide the cartridge axially inside the barrel between a first extended forward position wherein the writing tip extends outside the barrel and a second retracted rearward position wherein the writing tip is retracted inside the barrel from the first extended forward position along an axial rearward direction, the self-retracting system comprising:

a button configured to, when actuated, move the cartridge into the first extended forward position, and when not actuated, move the cartridge into the second retracted rearward position, and wherein the self-retracting system further comprises a linkage that connects the button and the cartridge, the linkage being configured to convert an actuation of the button into a linear motion of the cartridge along the longitudinal axis, and wherein the linkage comprises a first sliding end configured to slide against an inclined surface of the cartridge, the linkage and the cartridge being configured so that upon actuation of the button, the first sliding end exerts pressure on the inclined surface so as to move the cartridge frontward.

2. The writing instrument according to claim 1, further comprising a sealing member configured to be actuated between a closed position where the sealing member substantially closes a writing passage of the writing instrument and an open position where the writing passage is not closed by the sealing member.

3. The writing instrument according to claim 2, wherein the cartridge is configured to actuate the sealing member from the closed position to the open position when the cartridge is moved from the second retracted rearward position to the first extended forward position and to allow the sealing member to move from the open position to the closed position when the cartridge is in the second retracted rearward position.

4. The writing instrument according to claim 2, wherein the sealing member comprises at least three moveable sealing parts configured to move between the closed position and the open position of the sealing member.

5. The writing instrument according to claim 4, wherein, in the open position, the sealing parts define between them a passage for the writing tip.

6. The writing instrument according to claim 2, wherein the sealing member is configured to interact with the barrel when the sealing member is in the closed position so as to form a substantially airtight sealing chamber therein, the writing tip being inside the sealing chamber when the cartridge is in the second retracted rearward position.

7. The writing instrument according to claim 2, further comprising a first biasing member for urging the sealing member from the open position to the closed position.

8. The writing instrument according to claim 7, wherein the self-retracting system further comprises a second biasing member configured to urge the self-retracting system toward the second retracted rearward position, wherein the second biasing member is preferably a spring.

9. The writing instrument according to claim 8, wherein the linkage is configured to better resist the second biasing member the more parallel the linkage is to the longitudinal axis during actuation.

10. The writing instrument according to claim 1, wherein the inclined surface is a straight inclined surface, formed at an angle of 15° to 75° with respect to the longitudinal axis, as measured in a plane including the longitudinal axis and perpendicular to the direction of a pivot axis.

11. The writing instrument according to claim 1, wherein the linkage comprises a second sliding end configured to, upon actuation of the button, either slide on one of an outer surface of the cartridge or slide on an inner surface of the barrel.

12. The writing instrument according to claim 11, wherein the linkage is connected to the button via a pivot, wherein the second sliding end and the pivot are configured to create a torque that brings the first sliding end to rotate around the pivot, thereby bringing the inclined surface and thus the cartridge to move frontward.

13. The writing instrument according to claim 12, wherein the button is configured to rotate around a pivot axis, and wherein an axis of the pivot is parallel to the pivot axis of the button.

14. The writing instrument according to claim 1, wherein the button is located on the barrel so as to be operated by a user when the writing instrument is held in a writing position.

15. The writing instrument according to claim 1, wherein the button is configured to rotate around a pivot axis, wherein the pivot axis is located near a rear end of the writing instrument.

16. The writing instrument according to claim 15, wherein a distance between the pivot axis and a front end of the button is more than 5 cm.

17. The writing instrument according to claim 1, wherein the writing tip is a stylus for use with an electronic writing surface.

18. The writing instrument according to claim 1, wherein the cartridge is configured to supply a writing medium to the writing tip.

* * * * *